March 23, 1926.
H. A. SPANNER
PRICE COMPUTING WEIGHING SCALE
Filed Feb. 15, 1922
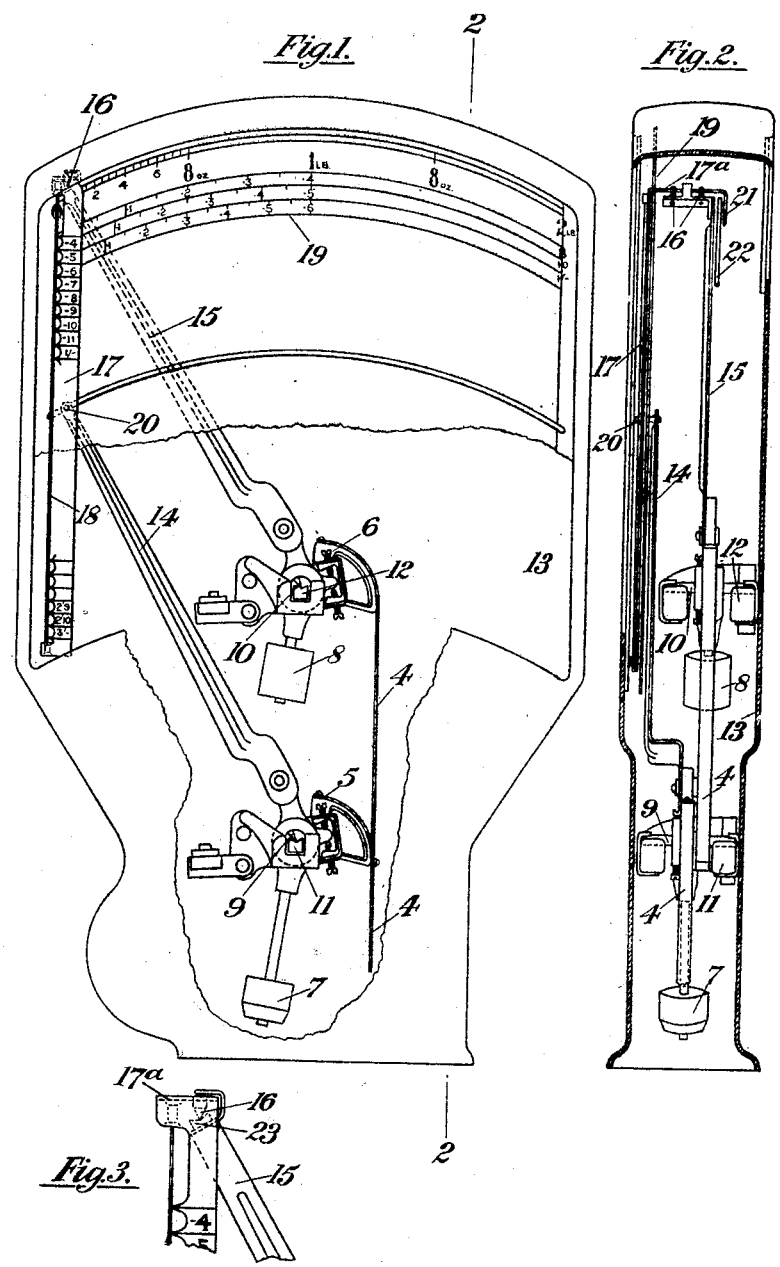
HUBERT A. SPANNER.
INVENTOR.
George E. Folkes.
ATTORNEY.

Patented Mar. 23, 1926.

1,578,214

UNITED STATES PATENT OFFICE.

HUBERT ALDERSLADE SPANNER, OF BIRMINGHAM, ENGLAND.

PRICE-COMPUTING WEIGHING SCALE.

Application filed February 15, 1922. Serial No. 536,831.

*To all whom it may concern:*

Be it known that HUBERT ALDERSLADE SPANNER, a subject of the King of Great Britain, residing at Soho Foundry, Birmingham, England, has invented a new and useful Improvement in Price-Computing Weighing Scales; and he does hereby declare the following to be a full, clear, and exact description of the same.

This invention has reference to improvements in price computing weighing scales of that character in which the price index is automatically moved across a graduated chart upon which the price computations are denoted, the index bearing thereon the prices per pound and the chart showing the multiples thereof according to the weight of the article.

The primary object of the present invention is to avoid the disadvantage which obtains in scales of this character in which the price index moves radially across a fan shaped chart, in this class of computing scale the computations as they near the axis of motion of the index are of necessity closer together and therefore more difficult to read, whereas by means of the present invention the spacing between the computations corresponding to equal increments of weight are substantially the same at any part of the computations whereby the reading of the computations is considerably improved more especially as the price and weight per pound advance.

The present invention comprises a price computing weighing scale wherein the automatically operated price index is located or disposed and maintained in a vertical line and the chart of computations likewise has its computations arranged in vertical lines. The invention further resides in the means for connecting the resistant of the scale with the index so as to avoid the introduction of any additional friction whereby the accuracy of the scale is not depreciated.

An application of the present invention will now be described in conjunction with the accompanying sheet of drawings which illustrate as much of a scale mechanism as is necessary to an understanding of the present invention.

Fig. 1 is a part sectional front elevation of the scale indicating mechanism and its connection to the pendulous weighing resistants.

Fig. 2 is an end sectional elevation taken on line 2—2 of Fig. 1, and

Fig. 3 is an elevation to an enlarged size of the top end of the price index showing its method of mounting on the upper arm connected to one of the pendulous resistants.

The goods pan and the levers whereon it is mounted are not shown in the accompanying drawings as they are unnecessary to an understanding of the present invention. The inner end of one of the weighing levers is suspended from the flexible nickeled steel ribbons 4 which are connected to the faces of the cams 5 and 6 these cams forming part of the pendulous resistants 7 and 8 and are mounted on the scale housing in known manner by means of knife-edges 9 and 10 vertically aligned under each other. These knife-edges respectively rest in the bearings 11 and 12 which are connected to the housing 13 of the scale. The pendulums 7 and 8 automatically counterbalance any load which is applied to the scale pan and it is in the indication of this load and in the means of combining therewith a price computation that the present invention particularly resides.

Connected to each of the pendulums is an arm respectively enumerated 14 and 15 both of which extend radially from the fulcra of the pendulums, (the base line of the knife-edges 9 and 10), the arms being parallel. Suspended from the outer end of the upper arm 15 by means of two pivot points 16 is the price index 17 which comprises a sheet metal member on which are engraved a series of numerals corresponding to the prices per pound within the range of the scale, this index has the usual form of wire 18 for determining the actual point at which the computations are to be read. The price index 17 is preferably also connected to the outer end of the lower arm 14 for the purpose of effecting a steadying motion of the index during its passage across the chart 19, this latter connection may take the form of a pin 20 located within a slot in the price index, a slight amount of freedom or clearance being allowed by the slot around the pin so as to avoid any additional friction between the lower arm 14 and the index 17.

The price index 17 which is vertically suspended from the outer end of the upper arm 15 is automatically traversed when a load is applied to the scale pan across the chart 19 which has price computations thereon. The chart has its computation in vertical alignment for a corresponding weight instead of as heretofore in radial lines radiating from the fulcrum of the pendulous resistant.

The price index 17 always moves so that it is maintained always parallel with its initial direction, that is, the vertical alignment of the index when there is no load on the scale is maintained at any load, and the index does not as is common practice move through an arc the axis of which is the fixed axis of the index.

In the construction of the price index as shown in the drawings it is formed with a weight indicating finger 21 which registers in conjunction with a weights chart 22 located on the opposite side of the scale housing to that of the price chart 19 so that both the salesman and the customer may observe the weight.

The particular means of connecting the price index 17 with the pendulous resistant do not per se form a part of the present invention but the means illustrated is a preferable one and is shown to an enlarged scale in the detail view Fig. 3. From this drawing it will be seen that the outer end of the upper arm 15 is provided with cup bearings 23 in which the pivot points 16 are located. These pivot points are in turn mounted in the sheet metal cross piece 17ª which forms the connecting member between the price index 17 and the weight indicating finger 21. By this means a free suspension is obtained of the price index 17 upon the arm 15 which will admit of true vertical alignment being obtained by the index 17 in accordance with the vertical alignment of the price numerals corresponding to any given weight.

Claims:—

1. In a price computing weighing scale, the combination of a scale housing, a fixed weight and price chart located within said housing, automatic means for offsetting the load applied to the scale, a vertically disposed traversable weight indicating price index and means connecting said index to the load offsetting means for supporting and maintaining the index parallel with its initial direction throughout its traverse.

2. In a price computing scale the combination of a scale housing, a fixed weight and price chart located within the said housing whereon price computations or numerals are ranged in vertical lines, means for automatically offsetting the load applied to the scale pan, arms connected to the said load offsetting means, and a traversable price index connected with said arms said index being suspended therefrom and so supported that the index maintains itself parallel with its initial direction throughout its traverse.

3. In price computing weighing scales the combination of a scale housing, a fixed weight and price computing chart within said housing, pendulous resistants to automatically offset the load applied to the scale pan, and a traversable vertical price index connected to said pendulous resistants and arranged to be read in conjunction with the said chart, said index being supported so that it maintains itself parallel with its initial direction throughout its traverse.

4. In price computing weighing scales the combination of a scale housing, a fixed weight and price computing chart located within said housing, two pendulous non-coaxial bodies forming a resistant to automatically offset any load applied to the scale pan, parallel arms connected to said duplex pendulous resistants and a vertical price index connected to the said arms and arranged to pass across the face of the said chart, said index being supported so that it maintains itself parallel with its initial direction throughout its traverse.

In testimony whereof, I have signed my name to this specification.

HUBERT ALDERSLADE SPANNER.